United States Patent
Parkinson et al.

(10) Patent No.: US 8,011,714 B2
(45) Date of Patent: Sep. 6, 2011

(54) STOWABLE SEAT AND SEAT STORAGE STRUCTURE

(75) Inventors: Matthew Frank Parkinson, Ann Arbor, MI (US); Robert Charles Steinbrecher, Dexter, MI (US); Hamshivraj Singh Dhamrat, Milan, MI (US); William Deming, Fenton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 147 days.

(21) Appl. No.: 12/466,115

(22) Filed: May 14, 2009

(65) Prior Publication Data

US 2010/0289290 A1 Nov. 18, 2010

(51) Int. Cl.
*B60N 2/04* (2006.01)

(52) U.S. Cl. .................. 296/65.03; 296/64; 296/65.09

(58) Field of Classification Search ............... 296/64, 296/65.03, 65.09, 69; 297/14, 15, 256.16
See application file for complete search history.

(56) References Cited

U.S. PATENT DOCUMENTS

| | | | | |
|---|---|---|---|---|
| 1,199,002 A | * | 9/1916 | Freise | 297/14 |
| 1,784,390 A | * | 12/1930 | Rice | 297/324 |
| 4,527,828 A | * | 7/1985 | Groce et al. | 296/65.09 |
| 4,580,832 A | * | 4/1986 | Maruyama et al. | 297/14 |
| 5,533,774 A | * | 7/1996 | Cavanaugh | 296/66 |
| 5,984,397 A | * | 11/1999 | Dawson et al. | 296/65.09 |
| 6,196,610 B1 | | 3/2001 | Pesta et al. | |
| 6,375,255 B1 | | 4/2002 | Maruta et al. | |
| 6,682,120 B2 | | 1/2004 | Kamida et al. | |
| 6,955,386 B2 | | 10/2005 | Rhodes et al. | |
| 6,962,384 B2 | | 11/2005 | Rhodes et al. | |
| 7,040,685 B2 | | 5/2006 | Sumida et al. | |
| 7,393,038 B2 | * | 7/2008 | Yajima et al. | 296/65.03 |
| 7,578,536 B2 | * | 8/2009 | Yajima et al. | 296/65.03 |
| 2007/0114819 A1 | * | 5/2007 | Dougherty | 297/14 |
| 2010/0102585 A1 | * | 4/2010 | Kato et al. | 296/24.34 |
| 2010/0156134 A1 | * | 6/2010 | McBride | 296/65.09 |

* cited by examiner

*Primary Examiner* — Jason S Morrow
(74) *Attorney, Agent, or Firm* — Gifford, Krass, Sprinkle, Anderson & Citkowski, P.C.

(57) ABSTRACT

The present invention discloses a stowable seat and seat storage structure that affords for storing of the stowable seat in a vehicle and yet not use or occupy any floor or sub-floor cargo space. An interior side wall for the vehicle is also provided, the interior side wall having a recess that is dimensioned for the stowable seat to fit at least partially therewithin when it is detached from the floor and folded into a stowed configuration.

17 Claims, 2 Drawing Sheets

STOWABLE SEAT AND SEAT STORAGE STRUCTURE

FIELD OF THE INVENTION

The present invention relates to a stowable seat and seat storage structure for storing the seat in a vehicle. In particular, the invention is related to a stowable seat and seat storage structure that allows for the storing of the seat while not using floor or sub-floor cargo space.

BACKGROUND OF THE INVENTION

The use of removable seats in motor vehicles such as minivans, full-size vans and the like is known. Such seats can be removed in order to maximize cargo space behind a front driver seat, passenger seats, etc., and typically include a mechanism that affords for their releasable mounting to a floor in the interior of the vehicle. In addition, removable seats typically fold into a stowed configuration and are removed from the vehicle, placed on the floor or at least partially underneath the floor of the vehicle when detached from the floor and stored. Although removable seats can provide extra cargo space, convenience to a user of a vehicle, etc., heretofore removable seats have occupied floor and/or sub-floor cargo space when placed in a stored position/location within the vehicle.

In particular, U.S. Pat. No. 7,393,038 discloses a vehicle seat and seat storage structure that affords for a seat cushion to be detached from a seat base, the seat base, the cushion and a backrest operable to be folded and stored in a recess that is provided in a floor or an area underneath another seat of a vehicle. Likewise, U.S. Pat. Nos. 6,955,386 and 6,962,384 disclose folding seats that can be stored underneath the floor of the vehicle or in a tub that is at least partially within the floor of the vehicle. As such, a stowable seat and seat storage structure that would allow for the stowable seat to be stored within the interior of a vehicle, and yet not occupy any floor or sub-floor cargo space, would be desirable.

SUMMARY OF THE INVENTION

The present invention discloses a stowable seat and seat storage structure that affords for removal of the seat from an in-use or seating location and storing of the seat in a vehicle without occupying any floor or sub-floor cargo space. The stowable seat can have an in-use or seating configuration and a stowed configuration, The seating configuration can be provided by a seat base and a seat back of the seat being oriented with respect to each other at a generally right angle and the stowed configuration can be provided by the seat base and the seat back being oriented generally parallel to each other. It is appreciated that the stowable seat is operable to mount or attach to and detach from a floor in the vehicle.

An interior side wall for the vehicle is also provided, the interior side wall having a recess that is dimensioned for the stowable seat to fit at least partially therewithin when it is detached from the floor and folded into the stowed configuration. The interior side wall can be an interior trim panel and may be an interior rear quarter trim panel. The recess can have an opening that faces the interior of the vehicle and also have an inner wall with a contoured shape that is complementary to the stowable seat when it is in its stowed configuration.

Detaching the stowable seat from the floor of the vehicle and removing it from its normal in-use position allows for the seat to be stored at least partially within the interior side wall and thus not occupy normal or typical cargo space within the vehicle. In some instances, the stowable seat is generally flush with the interior side wall when it is placed at least partially within the recess in a stored position. In addition, the stowable seat can be a rearward seat of the vehicle and may or may not be a second row seat, a second row center seat and the like.

A storage member can also be included and be operable to hold the stowable seat at least partially within the recess in its stored position. In some instances, the storage member can be a strap that is fixedly attached to the interior side wall.

A process for storing the stowable seat in the vehicle, so as not to occupy any floor or sub-floor cargo space, is also disclosed. The process includes providing the stowable seat and the interior side wall as discussed above. The stowable seat can be attached to the floor of the vehicle and subsequently detached therefrom and folded into the stowed configuration. During or after folding of the stowable seat into the stowed configuration, the seat can be placed at least partially within the recess of the interior side wall and optionally held in place with the storage member. In this manner, the stowable seat is stored within the vehicle and yet does not occupy any floor or sub-floor cargo space.

DETAILED DESCRIPTION OF THE INVENTION

Figure 1:
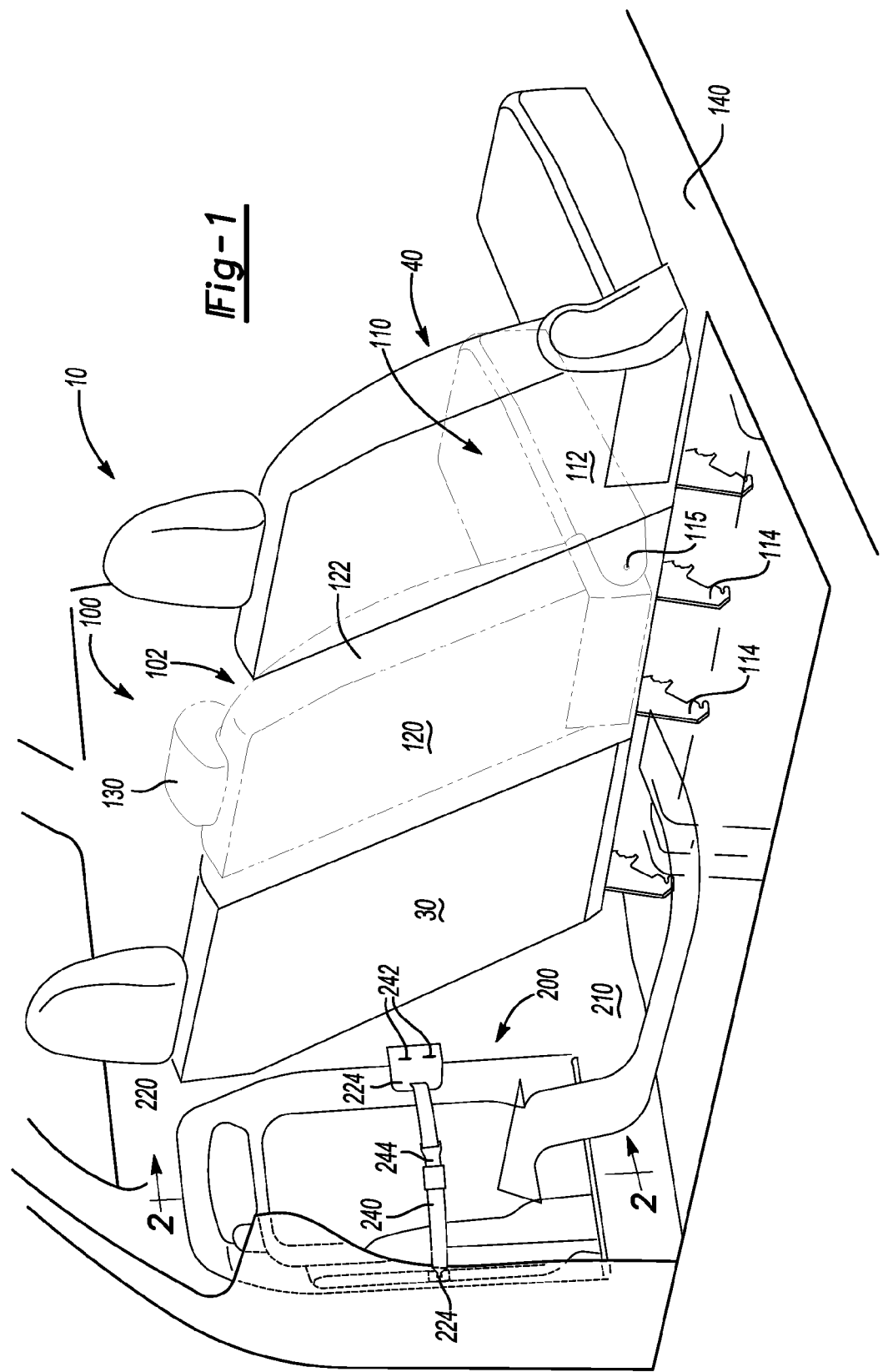
FIG. 1 is a perspective view of an embodiment of the present invention illustrating placement or movement of a stowable seat from an in-use position to a stored position.

The present invention discloses a stowable seat and seat storage structure for storing the seat in a vehicle. As such, the present invention has utility as a seating and/or storing system for a vehicle.

The stowable seat and seat storage structure can include a stowable seat that has an in-use or seating configuration and a stowed configuration. The seating configuration can be afforded by a seat base and a seat back of the seat being oriented at a generally right angle to each other while the stowed configuration can result from the seat base and the seat back being oriented generally parallel to each other. In some instances, the seat base can have a removable seat base cushion and/or the seat back can have a removable seat back cushion. The stowable seat can be any removable seat known to those skilled in the art that can be mounted or attached to a floor in a vehicle and detached therefrom. Such a seat can be a front row seat, a back row seat and the like. In particular, the stowable seat can be a second row seat, a third row seat, a center seat in the second row, a center seat in the third row and the like. It is appreciated that if the seat base cushion and/or seat back cushion are provided as part of the stowable seat, then the seat can be folded into the stowed configuration with the seat base cushion and/or the seat back cushion removed from the seat base and/or seat back, respectively.

The seat storage structure can include an interior side wall for the vehicle, the interior side wall having a recess that is dimensioned for the stowable seat to fit at least partially therewithin when it has been removed from the floor and folded into the stowed configuration. The interior side wall can be an interior trim panel which may or may not be an interior rear quarter trim panel. The recess can have an opening that faces the interior of the vehicle and an inner wall that has a contoured shape that is complementary to the stowable seat when it is in the stowed configuration. It is appreciated that the contoured shape affords for the stowable seat in the stowed configuration to be stored at least partially within the recess such that the stowable seat fits generally flush with the interior side wall and thus provides a convenient and aesthetically pleasing storage structure for the vehicle. In addition, a storage member can be included that holds the stowable seat at least partially within the recess in a stored position such that it does not fall out during operation of the vehicle.

A process for stowing the stowable seat in the vehicle, so as not to occupy any floor or sub-floor cargo space, can include providing the stowable seat and the interior side wall. The stowable seat can be mounted or attached to the floor of the vehicle where it can be used by an individual. At a desired location and/or time, the stowable seat can be detached from the floor, folded into the stowed configuration and placed at least partially within the recess of the interior side wall in the stored position. In this manner, the stowable seat can be stored within the vehicle and yet not occupy any floor or sub-floor cargo space.

Figures 2, 3:
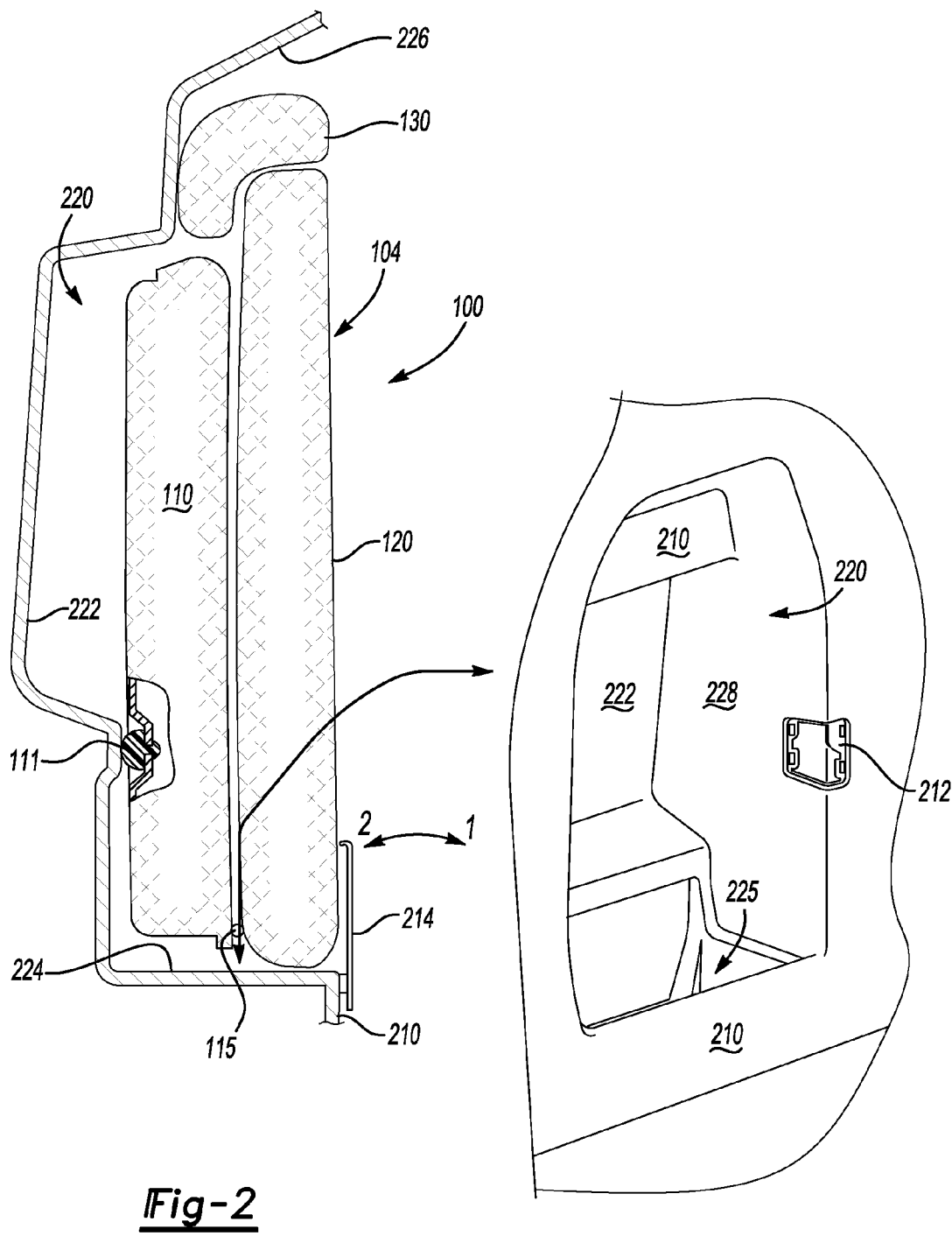
FIG. 2 is a side cross-sectional view of section 2-2 shown in FIG. 1.
FIG. 3 is a perspective view of a recess in an interior side wall shown in FIG. 1 without the presence of the stowable seat located at least partially therewithin.

Turning now to FIGS. 1-3, an embodiment of the stowable vehicle seat and storage structure is shown generally at reference numeral 10. The embodiment 10 can include a stowable seat 100 and a storage structure 200. In some instances, the stowable seat 100 can be located between a first seat 30 and a second seat 40, however this is not required. The stowable seat 100 can have a seat base 110 with an optional cushion 112, a seat back 120 with an optional cushion 122 and/or an optional head rest 130. As shown in FIG. 1, the stowable seat can have a seating configuration 102 in which the seat base 110 and the seat back 120 are oriented with respect to each other at a generally right angle. For the purposes of the present invention, the term "generally right angle" is defined to mean 90°±25°. As such, the seating configuration 102 is understood to include typical seating orientations that are used by individuals while traveling in a vehicle.

In some instances, the stowable seat 100 can have a floor mounting structure 114 that affords for the seat to attach or mount to a floor 140 of the vehicle. Such floor attachment structures are known to those skilled in the art and can include a forward attachment mechanism and a rearward attachment mechanism. In addition, it is appreciated that the floor attachment structure 114 provides mounting of the stowable seat 100 to the floor 140 in a secure and safe manner.

In the event that space is desired between the first seat 30 and the second seat 40, or some other space within the vehicle that can be provided by the removal of the stowable seat 100, the seat 100 can be detached from the floor 140 and folded into a stowed configuration 104 as shown in FIG. 2. It is appreciated that the stowable seat 100 can be located at different locations within the vehicle than between two seats and yet be detached from the floor 140 and folded into the stowed configuration 104. As such, the stowable seat 100 can be located at various locations within the vehicle and fall within the scope of the present invention. In addition, the stowable seat 100 can be used at more than one location within the vehicle so long as it can be mounted to the floor 140 at a given location and detached therefrom.

The stowed configuration 104 can be provided by the seat base 110 and the seat back 120 being folded such that they are generally parallel to each other. In some instances, a pivot joint or pivot axis 115 can be included that affords for the seat base 110 and seat back 120 to pivot or fold relative to each other. In addition, the pivot joint or pivot axis 115 can have a detent, catch and the like that affords for the seat to remain in a folded position when placing it into and/or removing it from the storage structure 200. For the purposes of the present invention, the term "generally parallel" is defined to mean two members being aligned with each other at an angle of 0°±25°. In this manner, the stowable seat 100 is folded into a relatively compact configuration.

After, or while, the stowable seat 100 is folded into the stowed configuration 104, the seat can be placed at least partially within a recess 220 that is part of and/or within an interior side wall 210. The interior side wall 210 can be an interior trim panel and may or may not be an interior quarter trim panel. In some instances, the side wall 210 is a rear quarter trim panel, e.g. a left rear quarter trim panel or a right rear quarter trim panel. The recess 220 can have an inner wall 222 that may or may not include a lower wall 224 and an upper wall 226. In addition, a pair of oppositely disposed side walls 228 can be included such that the recess 220 is enclosed on a back side that is proximate to a body panel of the vehicle. The inner wall 222, lower wall 224, upper wall 226 and/or side wall(s) 228 can have a contoured shape that is complementary with one or more dimensions or features of the stowable seat 100 in the stowed configuration 104, and thus provide a desired shaped and sized storage structure 200.

Looking specifically at FIGS. 2 and 3, a recess flange 214 can be included such that a lower volume or cavity 225 is afforded. The recess flange 214 may be fixedly attached to, may be part of or may be movable with respect to the interior side wall 210. For example and for illustrative purposes only, the recess flange can be attached to the interior side wall 210 using hook and loop fasteners, a snap mechanism, a tongue and groove structure and the like. In addition, a recess flange 214 can be included that pivots in a first direction 1 in order to provide greater access to the recess 220 and/or cavity 225, and thus aid in the placement of the stowable seat at least partially within the recess 220, and then pivots in a second direction 2 in order to enclose the lower volume or cavity 225 and better hold the seat 100 in a stored location.

In some instances, the storage structure 200 affords for the stowable seat 100 in the stowed configuration 104 to fit generally flush with the interior side wall 210 a shown in FIG. 2, however this is not required. In this manner, a convenient and efficient storage of the stowable seat 100 is provided without the storage of the seat within the vehicle occupying any floor or sub-floor cargo space that is typically used by removable and storable seats.

A storage member 240 can be included that provides for the stowable seat 100 to be held in place while in a stored position, i.e. while the seat is in its stowed configuration 104 and is located at least partially within the recess 220 as illustrated in FIGS. 2 and 3. The storage member 240 can be any storage member known to those skilled in the art that would provide for securing the stowable seat 100 at least partially within the recess 220. For example and for illustrative purposes only, the storage member 240 can be a strap, cord, arm and the like. In addition, the storage member 240 can have an attachment and/or release member 244, for example a buckle, and be fixedly attached to the interior side wall 210 at attachment points 242. For example, the storage member 240 can be fixedly secured to the interior side wall 210 at storage points 242 using threaded fasteners, welding, sewing, and the like. In addition, the storage member 240 can have one or more brackets 224 that attach to the interior side wall 210, for example at location 212.

While in use, the stowable seat 100 can be attached to the floor 140 and used by one or more individuals that are traveling within a vehicle that has the seat. In the alternative, the stowable seat 100 can be used to place articles or items on, for example groceries. In the event that space that is occupied by the stowable seat 100 while it is attached to the floor 140 is desired to be used and/or unoccupied by the seat, the seat 100 can be removed or detached from the floor 140 and folded into the stowed configuration 104. After being folded into the stored configuration 104, the stowable seat 100 can be placed at least partially within the recess 220. Thereafter, the optional storage member 240 can be used to hold the seat 100 in its stored position.

It is appreciated that the stowable seat 100 can be detached from the floor 140 and while it is being folded into its stored configuration 104, be placed at least partially within the recess 220 in the stored position. Stated differently, the stowable seat 100 can be placed into its stored position or stored location while it is being folded into the stored configuration. In addition, the stowable seat 100 can have an elastomer bumper or grommet 111 that can extend from the seat base 110 and/or seat back 120 and come into contact with the inner wall 222 when in the stored location as shown in FIG. 2. As such, the elastomer bumper or grommet 111 can reduce or prevent vibration, rattling and the like between the seat 100 and the storage structure 200. In addition, it is also appreciated from FIGS. 2 and 3 that the seat 100 can fit snuggly against an inner wall, a lower wall and an outer wall and not vibrate or rattle while stored in the recess 220. After the stowable seat 100 has been placed in the stored position, space previously occupied by the seat is available for use, and floor and/or sub-floor cargo space is still available.

It is appreciated that the stowable seat 100 and the storage structure 200 can be located within a motor vehicle and the motor vehicle may or may not be included as part of the embodiment 10. Such a motor vehicle can be a minivan, full-size van, SUV, bus and the like. The stowable seat 100 and the storage space 200 can be made from a variety of materials, illustratively including leather, plastics, polymers, foam, metals, alloys, ceramics, wood and combinations thereof.

The foregoing drawings, discussion and description are illustrative of specific embodiments of the present invention, but they are not meant to be limitations upon the practice thereof. Numerous modifications and variations of the invention will be readily apparent to those of skill in the art in view of the teaching presented herein. As such, it is the following claims, including all equivalents, which define the scope of the invention.

We claim:

1. A stowable seat and seat storage structure for storing the stowable seat in a vehicle and not using floor or sub-floor cargo space, the stowable seat and seat storage structure comprising:
    a stowable seat having a seating configuration with said stowable seat attached to a floor in the vehicle and a stowed configuration with said stowable seat unattached from the floor, said stowable seat also having a floor mounting structure operable to attach and detach said stowable seat from the floor in the vehicle;
    an interior side wall of the vehicle, the interior side wall having a recess with an inner wall, a lower wall, and an outer wall dimensioned for said stowable seat to fit at least partially within said recess and snuggly up against said inner wall, lower wall and outer wall when in said stowed configuration, for the purpose of storing and preventing rattling of said stowable seat in said recess of said interior side wall and not occupy any floor or sub-floor cargo space of the vehicle.

2. The stowable vehicle seat and storage structure of claim 1, wherein said stowable seat has a seat base and a seat back, said seat base and said seat back oriented at a generally right angle to each other when said stowable seat is in said seating configuration and said seat base and said seat back oriented generally parallel to each other when said stowable seat is in said stowed configuration.

3. The stowable vehicle seat and storage structure of claim 1, wherein said stowable seat is a rearward seat of the vehicle.

4. The stowable vehicle seat and storage structure of claim 3, wherein said stowable seat is a second row seat of the vehicle.

5. The stowable vehicle seat and storage structure of claim 4, wherein said second row seat is a second row center seat of a motor vehicle.

6. The stowable vehicle seat and storage structure of claim 1, wherein said interior side wall is an interior trim panel of the vehicle.

7. The stowable vehicle seat and storage structure of claim 6, wherein said interior trim panel is an interior rear quarter trim panel.

8. The stowable vehicle seat and storage structure of claim 1, wherein said recess has an opening facing an interior of the vehicle.

9. The stowable vehicle seat and storage structure of claim 8, wherein said inner wall has a contour shape that is complementary to said stowable seat in said stowed configuration.

10. The stowable vehicle seat and storage structure of claim 7, further comprising a storage attachment member operable to hold said stowable seat in said stored position.

11. The stowable vehicle seat and storage structure of claim 10, wherein said storage attachment member is a strap attached to said quarter trim panel.

12. The stowable vehicle seat and storage structure of claim 11, wherein said strap extends across said recess and holds said stowable seat in said stored position.

13. The stowable vehicle seat and storage structure of claim 11, wherein said strap is fixedly attached to said quarter trim panel.

14. A process for storing a stowable seat in a vehicle so as not to occupy any floor or sub-floor cargo space, the process comprising:
    providing a stowable seat having a seating configuration with the stowable seat attached to a floor in the vehicle and a stowed configuration with the stowable seat unattached from the floor, the stowable seat also having a floor mounting structure operable to attach and detach the stowable seat from the floor;
    providing an interior side wall with a recess having an inner wall, a lower wall, and an outer wall dimensioned for the stowable seat to fit snuggly and at least partially within the recess and thereby prevent rattling of the stowable seat when in the stowed configuration;
    detaching the stowable seat from the floor;
    folding the stowable seat into the stowed configuration; and
    placing the stowable seat in the stowed configuration at least partially within the recess of the interior side wall in a stored position, for the purpose of storing the stowable seat without rattling thereof and not occupy any floor or sub-floor cargo space.

15. The process of claim 14, wherein the stowable seat has a seat base and a seat back, the seat base and the seat back oriented generally at a right angle to each other when the stowable seat is in the seating configuration and the seat base and the seat back oriented generally parallel to each other when the stowable seat is in the stowed configuration.

16. The process of claim 14, wherein the interior side wall of the vehicle is an interior rear quarter trim panel of the vehicle.

17. The process of claim 14, further including strapping the stowable seat at least partially within the recess with a strap.

* * * * *